Jan. 22, 1963     L. J. GEE     3,075,161
RESISTANCE THERMOMETER PROBE
Filed March 27, 1961
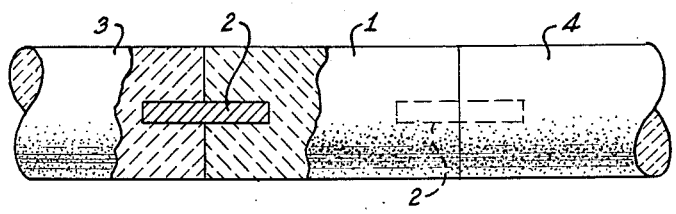
INVENTOR:—
LEROY J. GEE
BY
ATTORNEYS

3,075,161
RESISTANCE THERMOMETER PROBE
Leroy J. Gee, Palo Alto, Calif., assignor to American Radiator & Standard Sanitary Corporation, New York, N.Y., a corporation of Delaware
Filed Mar. 27, 1961, Ser. No. 98,497
3 Claims. (Cl. 338—28)

This invention relates to and in general has for its object the provision of a compact resistance thermometer probe capable of operating in a temperature range of from 3500° F. to 4000° F. in an oxidizing atmosphere, and which can be designed for a life of from 100 to 1000 hours, capable of withstanding a temperature change of 1000° F./sec., and of responding in 2 to 3 seconds in quiescent air, having a signal output in the order of 20 mv. at 3500° F., having an accuracy of ±1% for the first 100 hours of operation and an acuracy in the order of ±2% during the following 1000 hours of operation.

The need for adequate means of measuring high temperatures in an oxidizing atmosphere has existed for some time. For some applications, such special methods as pyrometric devices and pneumatic probes have been utilized. However, temperature sensors having the necessary characteristics (i.e., accuracy, stability, long life, repeatability, and ease of application), although commonly available for the lower and middle-temperature regions, are presently not available for the high-temperature regions. Considerable effort has been devoted to this particular problem, especially in the area of thermoelectric methods. At least seven thermocouple combinations presently having calibrations up to 4000° F. are described in the literature. Unfortunately, however, none of these can be used in oxidizing environments. Thus, the combination of high temperatures and oxidizing atmospheres presents an obstacle that has not yet been satisfactorily overcome. Because of this lack of available thermoelectric materials that can be directly used in high-temperature oxidizing atmospheres, much effort has been expended in developing sheaths and coatings to protect thermocouple junctions from the effects of oxidation. These efforts have not been completely successful because of the difficulty of obtaining completely gas-tight and impermeable sheaths. Where these approaches are successful, the performance characteristics of the thermocouple are usually compromised because of the necessary addition of considerable mass and size to the temperature-sensitive areas.

Various known methods of temperature sensing are: expansion, pressure, and resistance thermometers; thermocouples; pyrometers. Expansion- and pressure-type thermometers are generally applicable to the lower temperature regions where the physical characteristics of the sensor material, such as linear expansion, volumetric expansion, or vapor pressures, are accurately known. At extremely high temperatures, the uncertainty of these physical properties and the difficulty of finding suitable materials to serve either as the sensor or to contain the sensor usually eliminate these particular methods for consideration. At the other extreme, pyrometric devices are particularly applicable to high-temperature measurements but require that the source emissivity be known or that black-body conditions exist before accurate measurements can be obtained. In the present application, the geometrical limitation precludes pyrometric means. It appears then that the solution lies in either some unique thermoelectric approach or the resistance-thermometer concept. In the past decade, a major portion of the research work in the field of high-temperature sensing has been devoted to the development of suitable thermocouples, now extensively utilized.

More specifically, the object of this invention is the provision of a resistance thermometer probe including a thoria temperature-sensor or tip connected at spaced points thereon with zirconia electrical leads.

Another object of this invention is the provision of a probe of the character above described wherein the contact resistance between the thoria sensor and the zirconia leads is maintained at a minimum by splicing these members together with iridium pins.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

The single FIGURE of this drawing is a side elevation of a probe embodying the objects of my invention, portions thereof being partly in section so as to better illustrate its construction.

The probe shown in this figure includes a central cylindrical section 1 of thoria bonded at each of its ends by iridium pins 2 to zirconia leads 3 and 4.

Here the central thoria section serves as the sensing element, for although both the thoria and zirconia are refractory oxides, the electrical resistivity of the thoria is at least $10^2$ to $10^6$ times greater (depending on the source) than that of zirconia. In the high-temperature region, say, 2500° F. or greater, zirconia is essentially a conductor, while thoria is still an insulator. The dimensions of the thoria cylinder 1 can be varied to suit the time response and circuit requirements. The iridium pins 2 serve as contact bridges between the thoria and zirconia and this is an important factor, for it is essential to maintain the contact resistance between these elements as low as possible.

Since the electrical resistance of thoria is a known function of temperature, its resistance is an indication of temperature.

A structure of this kind can be produced in one of several ways. The thoria sensor can be built up around the iridium pins by a sintering process or by flame-spraying, and then the zirconia leads can be built up around the exposed ends of the pins by either sintering or by flame-spraying.

The diameter of the composite structure above described can be in the order of from ⅛ inch to ¼ inch, although there is nothing critical about this dimension.

At all events, an all-refractory oxide probe is produced wherein a good electrical bond exists between the thoria and the zirconia leads, and which should have an acceptable life in an oxidizing atmosphere, an accuracy of ±1% for the first 100 hours of operation, a ±2% accuracy for the following 1000 hours of operation; be capable of withstanding temperature changes in the order of 1000° F./sec., have a time response in the order of from 2 to 3 seconds in quiescent air, and have a signal output of at least 20 mv. at 3500° F.

I claim:

1. A resistance thermometer probe comprising: a central probe sensor made of a first refractory metal oxide; electrical leads bonded to each end of said probe sensor, said leads being made of a second refractory metal oxide having an electrical resistivity less than the electrical resistivity of said first refractory oxide, and refractory metal pins interconnecting said leads and said probe sensor and bonded thereto.

2. A probe of the character set forth in claim 1 wherein said probe sensor is made of thoria and wherein said leads are made of zirconia.

3. A probe of the character set forth in claim 2 wherein said pins are made of iridium.

References Cited in the file of this patent

UNITED STATES PATENTS 2,356,237     Geller _____ Aug. 22, 1944